(12) United States Patent
Buchmeyer et al.

(10) Patent No.: US 12,038,273 B2
(45) Date of Patent: Jul. 16, 2024

(54) WHEEL HOLDER

(71) Applicant: BEISSBARTH GMBH, Munich (DE)

(72) Inventors: Markus Buchmeyer, Munich (DE); Nicolai Ganser, Munich (DE)

(73) Assignee: BEISSBARTH GmbH, Munich (DE)

( * ) Notice: Subject to any disclaimer, the term of this patent is extended or adjusted under 35 U.S.C. 154(b) by 0 days.

(21) Appl. No.: 17/924,435

(22) PCT Filed: Apr. 29, 2021

(86) PCT No.: PCT/EP2021/061240
§ 371 (c)(1),
(2) Date: Nov. 10, 2022

(87) PCT Pub. No.: WO2021/228564
PCT Pub. Date: Nov. 18, 2021

(65) Prior Publication Data
US 2023/0184530 A1 Jun. 15, 2023

(30) Foreign Application Priority Data

May 12, 2020 (DE) .......................... 102020112816.9

(51) Int. Cl.
*B60B 30/02* (2006.01)
*G01B 5/00* (2006.01)
(Continued)

(52) U.S. Cl.
CPC ............ *G01B 5/0004* (2013.01); *B60B 30/02* (2013.01); *G01B 5/255* (2013.01); *B60B 30/04* (2013.01);
(Continued)

(58) Field of Classification Search
CPC ......... B60B 30/02; B60B 30/04; G01B 5/255; G01B 21/26; G01B 2210/10; Y10T 29/53448
See application file for complete search history.

(56) References Cited

U.S. PATENT DOCUMENTS 978,976 A 12/1910 Wolff, Jr.
4,335,519 A 6/1982 Alsina
(Continued)

FOREIGN PATENT DOCUMENTS

DE 10 2016 217 290 A1 3/2018
DE 10 2018 215 165 A1 3/2020
(Continued)

OTHER PUBLICATIONS

International Search Report and Written Opinion, PCT/EP2021/061240, dated Jul. 13, 2021 (13 Pages).

*Primary Examiner* — Jermie E Cozart
(74) *Attorney, Agent, or Firm* — Ware, Fressola, Maguire & Barber LLP

(57) ABSTRACT

A wheel holder (1) for clamping attachment to a wheel (9), in particular to a wheel (9) of a motor vehicle, and for attaching a target (5) for vehicle wheel alignment measurement, comprises a base body (10) having a central portion and at least two, in particular three, arms (22, 23, 24) extending radially outwards from the central portion of the base body (10). Each of the arms (22, 23, 24) has a movable element (32a, 33a, 34a) which is movable relative to the base body (10) in the radial direction in order to vary the length of the arm (22, 23, 24) in the radial direction; a pressure element (52, 53, 54), in particular a compression spring, which is arranged and adapted to push the movable element (32a, 33a, 34a) outward in radial direction; and a traction element (62, 63, 63) mechanically coupled to the moveble element (32a, 33a, 34a) and arranged and adapted (Continued)

to pull the movable element (32*a*, 33*a*, 34*a*) inward in radial direction. The wheel holder (1) further comprises a coupling element (60) that mechanically couples the traction elements (62, 63, 63) of the at least two arms (22, 23, 24) to each other.

16 Claims, 6 Drawing Sheets

(51) Int. Cl.
　　　*G01B 5/255*　　　(2006.01)
　　　*B60B 30/04*　　　(2006.01)
　　　*G01B 21/26*　　　(2006.01)
(52) U.S. Cl.
　　　CPC .......... *G01B 21/26* (2013.01); *G01B 2210/10* (2013.01); *Y10T 29/53448* (2015.01)

(56) References Cited

U.S. PATENT DOCUMENTS

| | | | |
|---|---|---|---|
| 5,987,761 | A | 11/1999 | Ohnesorge |
| 2014/0070474 | A1* | 3/2014 | Gray ...................... G01B 21/26 269/156 |
| 2014/0115906 | A1 | 5/2014 | Pruitt et al. |
| 2019/0310066 | A1 | 10/2019 | Kambhaluru et al. |

FOREIGN PATENT DOCUMENTS

| | | | | |
|---|---|---|---|---|
| DE | 10 2019 113 128 A1 | 11/2020 | | |
| FR | 3016691 A1 | 7/2015 | | |
| WO | 2014/039053 A1 | 3/2014 | | |
| WO | WO-2017093922 A1 * | 6/2017 | ............. | G01B 21/26 |
| WO | WO-2018046222 A1 * | 3/2018 | ............. | G01B 5/255 |

* cited by examiner

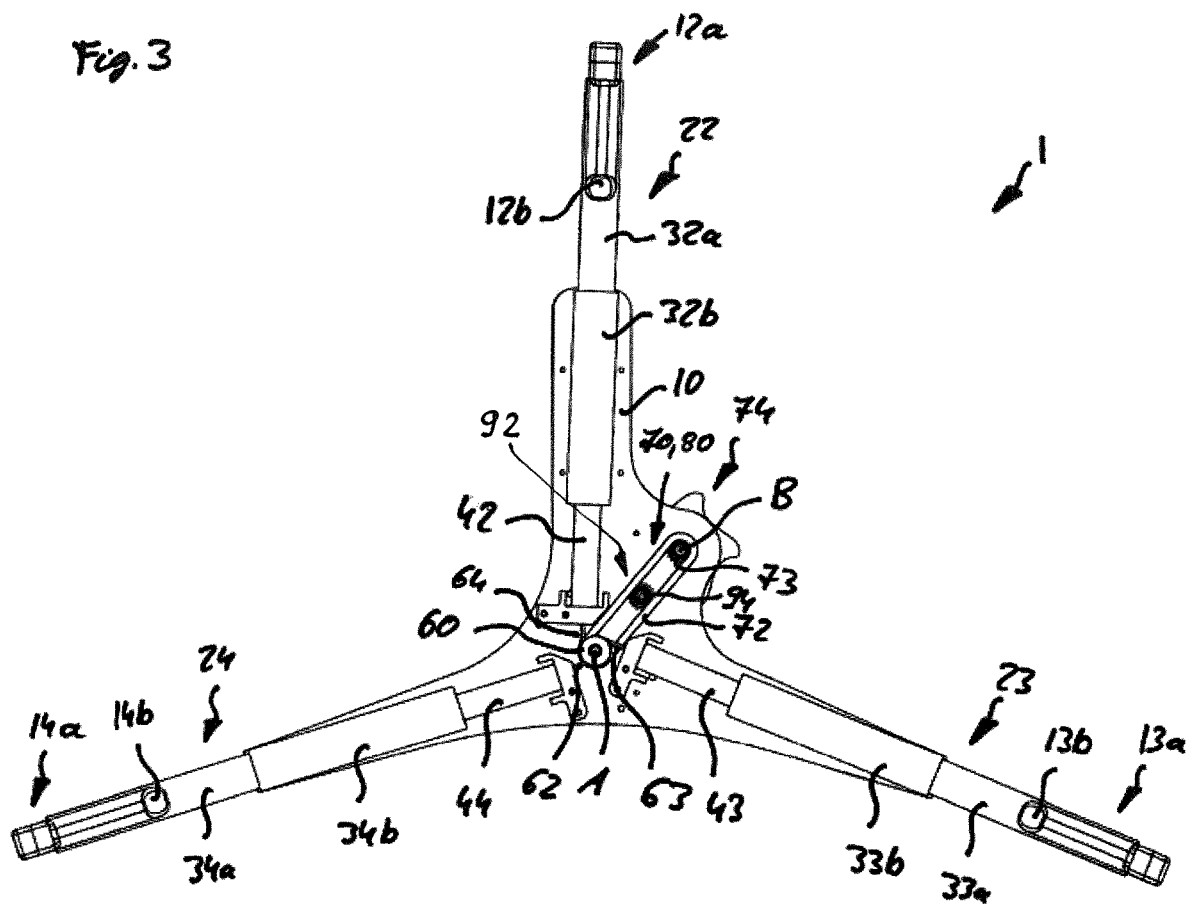
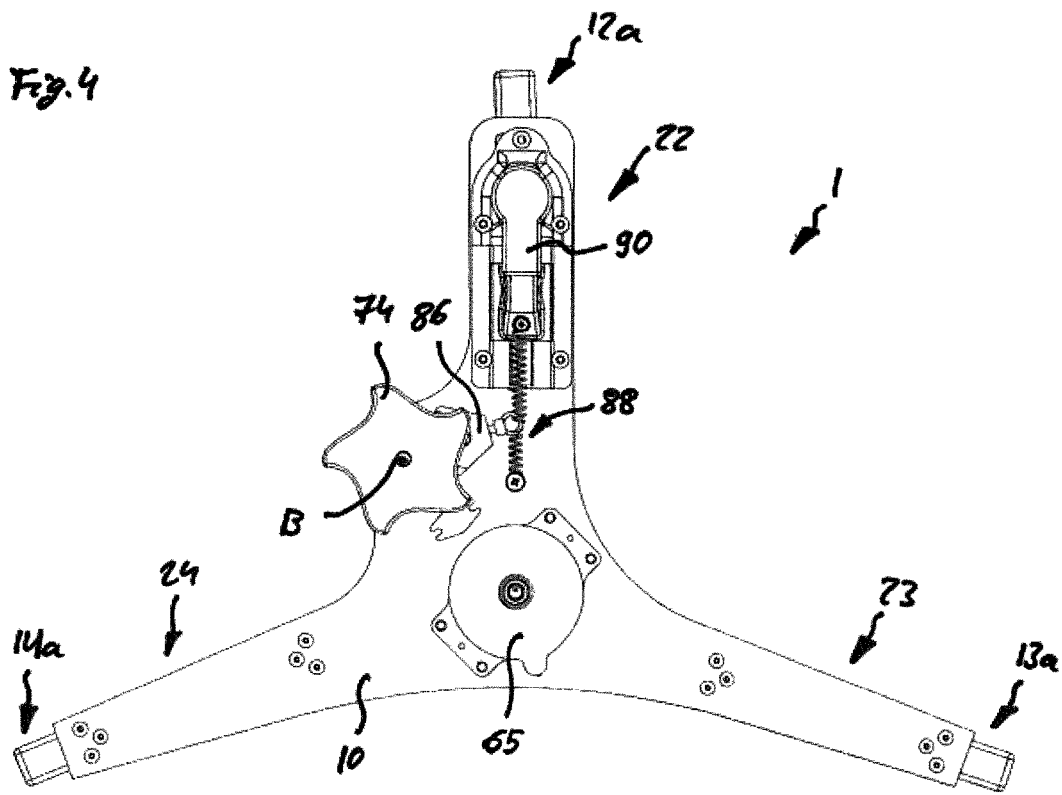

WHEEL HOLDER

The invention relates to a wheel holder or wheel clamp, in particular a wheel holder for vehicle wheel alignment measurement. The invention also relates to a method of mounting and to a method of unmounting such a wheel holder to and from a wheel of a vehicle, in particular a motor vehicle.

For vehicle measurement, in particular vehicle wheel alignment measurement, there are often mounted wheel holders ("wheel adapters"), which are adapted to support sensors and/or measurement marks ("targets"), on the wheels of the vehicle to be measured for wheel alignment. The handling of such wheel holders, in particular the attaching and detaching thereof to and from the wheels of the vehicle, is as a rule complex and difficult. In particular, there are several working steps required that have to be carried out using two hands. There is a risk that the measurement results of the wheel alignment measurement will be falsified by incorrect and/or inaccurate attachment of the wheel holders.

It is an object of the invention to simplify mounting and unmounting of a wheel holder to and from the wheels of a vehicle and to reduce the risk of incorrect and/or inaccurate mounting.

This object is met by the wheel holder ("wheel adapter") of independent claim 1 and by the methods of mounting and unmounting a wheel holder according to claims 15 and 16. Advantageous developments are indicated in the dependent claims.

A wheel holder ("wheel adapter") according to the invention, which is provided and designed for clamping attachment to a wheel, in particular to a wheel of a motor vehicle, and for attaching a target or a sensor for wheel alignment measurement, comprises a base body with a central portion, and at least two, in particular three, arms extending radially outwards from the central portion of the base body. Each arm comprises a movable element that is movable relative to the central portion of the base body in the radial direction in order to vary the length of the arm in the radial direction; a pressure element, in particular a compression spring, which is arranged and designed to push the movable element outwards in the radial direction; and a traction element that is mechanically coupled to the movable element and is arranged and designed to pull the movable element inwards in the radial direction. The wheel holder comprises furthermore a coupling element that mechanically couples the traction elements of the at least two arms to each other.

The compression springs, the traction elements and the coupling element together constitute a synchronization system having a central rotation element which has the effect that the traction elements are movable only synchronously with each other and that all movable outer elements move synchronously outwards in the radial direction under the influence of the compression springs. With the aid of the traction elements, the movable outer elements can be pulled inwards in the radial direction. Due to the fact that the traction elements are coupled with each other by the coupling element, the traction elements can be moved only synchronously with each other, so that the movable outer elements can be moved inwards synchronously with each other by the traction elements.

In this way, it is possible to easily and conveniently apply the wheel holder to a wheel and fix it to the wheel.

In one embodiment, each of the arms has a stationary element that is fixedly connected to the base body or is integrally formed with the base body. The movable element is displaceable relative to the stationary element in the radial direction. In particular, the movable element can be designed as a slide that is guided relative to the stationary element or at least partially enclosed by the stationary element. In this way, a stable and reliable mechanism is provided which allows the length of the arms to be varied by displacing the movable elements relative to the stationary elements.

In one embodiment, the movable elements each have a claw or clamp at their outer ends adapted to bear or abut against the tread surface of the wheel. In one embodiment, the movable elements also have spacers designed to abut against a flank or side of the wheel. Using claws or clamps and spacers, the wheel holder can be securely mounted to a wheel in a defined position and orientation so that measurements can be made with high accuracy.

In one embodiment, the coupling element comprises a central pulley that is rotatably mounted about a central shaft, in particular in a central portion of the base body. In this embodiment, the traction elements are formed as rope strands having a first end attached to the central pulley and a second end attached to the respective movable element. The rope strands can be wound onto and unwound from the central pulley by rotating the latter.

In this way, the movable elements can be synchronously moved inwards and outwards in the radial direction by rotating the pulley: by winding up the rope strands, the movable elements are synchronously pulled inwards in the radial direction by the rope strands. In unwinding the rope strands, the movable elements are synchronously pushed outwards in the radial direction by the compression springs.

In one embodiment, the coupling element is coupled to an elastic drive element, in particular a spiral spring. The drive element exerts a torque on the coupling element, which biases the coupling element in such a way that a traction force acting radially inwards is applied to the movable elements via the traction elements. In particular, the drive element may be attached to the base body and connected to the coupling element via the central shaft.

In one embodiment, the compression springs and the drive element are designed such that the inwardly directed traction forces of the traction elements are greater than the radially outwardly directed compressive forces of the pressure elements, so that the resulting forces pull the movable elements inwards in the radial direction when no external forces are applied to the movable elements. The wheel holder can thus be fixed to a wheel by the resulting inwardly directed forces.

In one embodiment, the at least two arms of the wheel holder extend in a common plane and the shaft of the coupling element is oriented orthogonally to the common plane. This allows for a space-saving arrangement of the components of the synchronization system.

In one embodiment, the pressure element of each arm is supported with a first, inner end on the base body, in particular on a supporting surface of the base body, and is supported with a second, outer end on the movable element, in particular on an inner end of the movable element in the radial direction, so that the movable element is pushed outwards in the radial direction by the force of the pressure element.

In one embodiment, the pressure element of each arm is at least partially surrounded by a casing, for example a sheath. By means of a casing, the pressure element is protected against contamination and external mechanical influences. In addition, the risk of injury to a user of the wheel holder, in particular a risk of jamming, is reduced by a casing.

In one embodiment, the traction elements/rope strands extend through internal or hollow spaces in the compression springs in space-saving manner.

In one embodiment, the wheel holder additionally comprises a clamping mechanism designed to apply to the movable elements an additional clamping force acting inwardly in the radial direction in order to fasten the wheel holder even more firmly and securely to a wheel.

In one embodiment, the clamping mechanism comprises a manually operable actuating element mechanically coupled to the movable elements, for example a rotary knob or a lever. By operating the actuating element, an additional clamping force acting inwardly in the radial direction can be applied to the movable elements.

In one embodiment, the actuating element is operatively connected to the coupling element, e.g. a central pulley, by means of a force transmitting element, for example a belt or chain. As a result, a torque applied manually to the actuating element can be transmitted to the coupling element via the force transmitting element, so that it exerts an additional clamping force acting inwardly in the radial direction on the movable elements via the traction elements, in particular rope strands.

In one embodiment, the actuating element is arranged at a radial distance from the coupling element or the pulley on a front side of the wheel holder so that it can be easily operated by a user when the wheel holder is attached to the wheel.

In one embodiment, the force transmitting element is arranged on a rear side of the wheel holder facing the wheel when the wheel holder is mounted to a wheel. In an alternative embodiment, the force transmitting element is arranged on a front side of the wheel holder facing away from the wheel.

In one embodiment, the wheel holder additionally comprises a locking mechanism configured to block the movement of the movable elements in at least one direction. In particular, the locking mechanism is designed to block the movement of the movable elements in a first direction and to release the same in a second direction, which is opposite to the first direction. By means of such a locking mechanism, the wheel holder can be securely fixed to a wheel without having to permanently apply a manual force to the movable elements and/or the actuating element of the wheel holder.

In one embodiment, the locking mechanism is switchable between a first state in which it blocks movement of the movable elements in a first direction and releases movement in a second direction opposite to the first direction, and a second state in which it releases movement of the movable elements in the first direction and blocks movement in the second direction. Such a switchable locking mechanism allows the movable elements to move outwardly in the radial direction after the locking mechanism is reversed, so that the wheel holder can be easily and conveniently removed from the wheel.

In one embodiment, the locking mechanism includes at least one ratchet gear and at least one locking member configured to engage the ratchet gear. The teeth of the at least one ratchet gear each have a steep flank and a flat flank. The locking member is arranged to be pivotable to a locking position in which a pawl of the locking member engages between a steep flank and a flat flank of the ratchet gear, abutting against the steep flank and thus blocking rotation of the ratchet gear. The at least one ratchet gear may be disposed on the shaft of the coupling element or on the shaft of the rotary knob. By combining a ratchet gear with a locking member, a reliable locking mechanism is provided.

In one embodiment, the locking mechanism comprises two ratchet gears arranged axially one above the other on a common shaft, in particular the shaft of the coupling element or the actuating element. The steep and flat flanks of the teeth of the two ratchet gears are oriented in opposite directions.

The locking member is pivotable between at least two positions by a switching mechanism: a first position in which a pawl of the locking member engages between a steep flank and a flat flank of the teeth of the first ratchet gear, striking or abutting against the steep flank and blocking rotation of the first ratchet gear in a first direction of rotation, and a second position in which a pawl of the locking member engages between a steep flank and a flat flank of the teeth of the second ratchet gear, abutting against the steep flank and blocking rotation of the first ratchet gear in a second direction of rotation opposite to the first direction of rotation.

In particular, the locking member has a first pawl adapted to engage the teeth of the first ratchet gear and a second pawl adapted to engage the teeth of the second ratchet gear.

In this way, a reliable locking mechanism can be provided that allows the release direction and the blocking direction of the locking mechanism to be easily switched or reversed by pivoting the locking member.

In one embodiment, the locking member is additionally pivotable to a third position ("freewheeling position") in which none of the pawls engage any of the ratchet gears, allowing the ratchet gears and the shaft connected to the ratchet gears to rotate in both directions.

In one embodiment, the wheel holder also includes a braking mechanism configured to decelerate the movement of the movable elements from the radially extended position back inwards in the radial direction. Such a braking mechanism can reduce the risk of damage and/or injury that may be caused by rapidly snapping back movable elements.

In particular, the braking mechanism may be designed as a rotation brake. In one embodiment, the rotation brake is designed as a brake wheel of the clamping mechanism that moves concomitantly with the force transmitting element. In this case, the concomitantly moving brake wheel is freely rotatable in a first direction, which corresponds to the direction of movement of the movable elements radially outwards; and rotatable with resistance in a second direction which is opposite to the first direction and corresponds to the direction of movement of the movable elements radially inwards.

In this way, the movable elements can be pulled outwardly without additional force to extend the arms so that the wheel holder can be easily applied to the wheel. At the same time, inward movement of the movable elements is decelerated by the braking mechanism, preventing dangerous "snapping back" of the movable elements and claws or clamps.

In one embodiment, the wheel holder has three arms that allow the wheel holder to be securely attached to the wheel. In particular, the three arms may be oriented in a symmetrical configuration with equal angular intervals of 120° from each other, but other angular intervals are possible as well.

In other possible embodiments, the wheel holder has more than three arms.

In one embodiment, a handle is formed on at least one of the arms to facilitate transport and handling of the wheel holder, in particular pulling apart or extending one of the arms. Additionally or alternatively, a handle may also be formed on the base body.

Embodiments of the invention also include methods of mounting a wheel holder on a wheel and unmounting a wheel holder from a wheel.

According to an exemplary embodiment of the invention, a method of mounting a wheel holder formed according to an embodiment of the invention, on a wheel, in particular on a wheel of a motor vehicle, comprises the following steps:

manually pulling one movable element radially outwards while unwinding the traction element connected to the movable element from the coupling element, thereby also unwinding the traction element of the other movable element or the traction elements of the other movable elements from the coupling element, so that also the other movable element or the other movable elements are synchronously moved outwards by the pressure element(s) thereof, in particular compression spring(s);

applying the wheel holder in centered manner on the wheel of the motor vehicle, in particular with its claws on the wheel tread surface;

releasing the movable element, whereby, due to the torque applied by the drive element to the coupling element, the movable elements of the arms are pulled inwards, so that the wheel holder is fixed to the wheel of the motor vehicle.

In one embodiment, the method further comprises additionally tightening or clamping the movable elements of the arms by manually operating a clamping mechanism and/or locking them by activating a locking mechanism in order to fix the wheel holder even more securely to the wheel.

According to an exemplary embodiment of the invention, a method of unmounting a wheel holder, which is formed according to an embodiment of the invention, from a wheel, in particular from a wheel of a motor vehicle, comprises the following steps:

if necessary, manually releasing a previously activated locking mechanism;

manual pulling at least one movable element radially outward, thus unwinding the traction element of the movable element from the coupling element, whereby also the traction element of the other movable element or the traction elements of the other movable elements unwind from the coupling element, so that also the other movable element or the other movable elements are synchronously moved outwards by the pressure element(s) thereof, in particular compression spring(s), whereby the claws are released from the wheel tread surface;

removing the wheel holder in lateral direction;

releasing or manually returning the movable element of one arm to an inner position in the radial direction, synchronously returning the other movable element of the other arm or the other movable elements of the other arms to an inner position in the radial direction, by pulling the movable elements inwards in the radial direction by the drive element acting on the coupling element and by the traction elements.

In one embodiment, the method comprises decelerating or braking the movement of the movable elements from the extended position in the radial direction back inwards by a braking mechanism, in particular by a rotation brake, to prevent the movable elements from snapping back quickly.

An exemplary embodiment of a wheel holder according to the invention will be described in more detail below with reference to the accompanying drawings, wherein:

FIG. 3 shows a plan view of the wheel holder from a rear side of the wheel holder facing the wheel in the mounted state of the wheel holder shown in FIG. 2.

FIG. 4 shows a plan view of the wheel holder shown in FIGS. 2 and 3 from the front side of the wheel holder facing away from the wheel in the mounted state.

FIG. 1 shows a schematic representation of a wheel 9 together with a wheel holder ("wheel adapter") 1 which is mounted on the wheel 9 and has a measuring plate ("target") 5 attached thereto.

Figure 1:
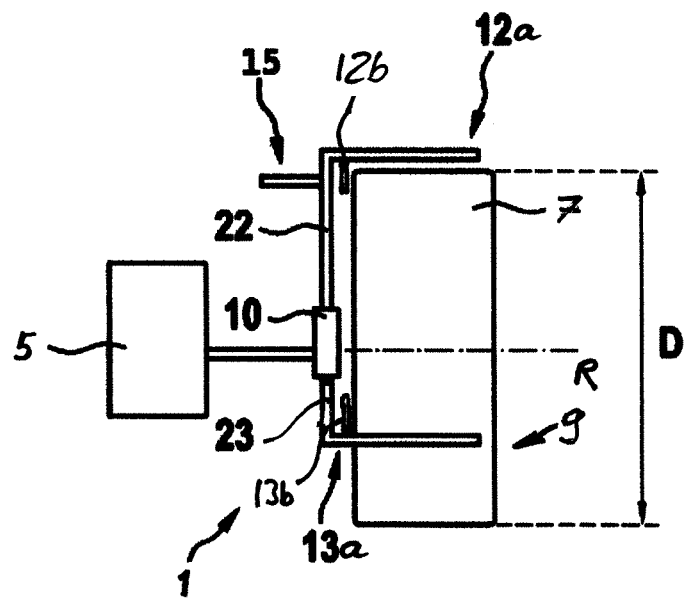
FIG. 1 shows a schematic representation of a wheel with a wheel holder mounted on the wheel.

The wheel holder 1 comprises a base body 10 and a plurality of arms 22, 23 extending radially outwards from the base body 10. The wheel holder 1 generally comprises three arms 22, 23, only two of which are visible in the illustration of FIG. 1.

Claws 12a, 13a are formed at outer ends of the arms 22, 23 remote from the base body 10 and extend substantially at right angles to the arms 22, 23. The claws 12a, 13a are provided to abut against the tread surface 7 of the wheel 9 when the wheel holder 1 is attached to the wheel 9 in order to fix the wheel holder 1 to the wheel 9.

Spacers 12b, 13b are formed on the claws 12a, 13a, which abut the outer flank or side of the wheel 9 when the wheel holder 1 is attached to the wheel 9 to ensure the correct orientation of the wheel holder 1 parallel to the wheel 9 and orthogonal to the rotation axis R of the wheel 9, respectively.

A handle 15 is formed on one of the arms 22, 23 to facilitate transport and handling of the wheel holder 1, in particular pulling apart or extending one of the arms. Additionally or alternatively, a handle 15 may also be formed on the base body 10.

Figure 2:
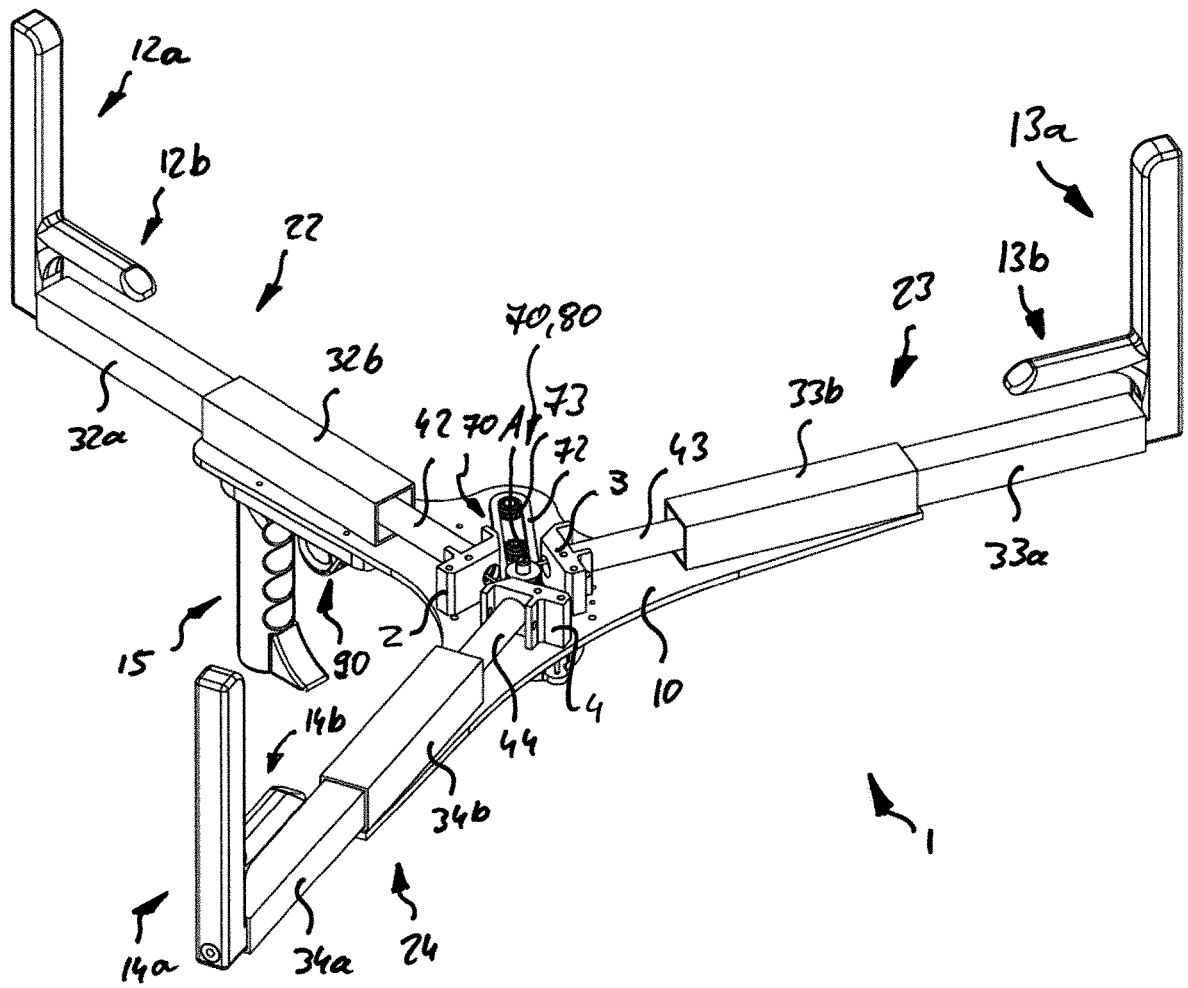
FIG. 2 shows a perspective view of a wheel holder according to an embodiment of the invention.
Figure 5:
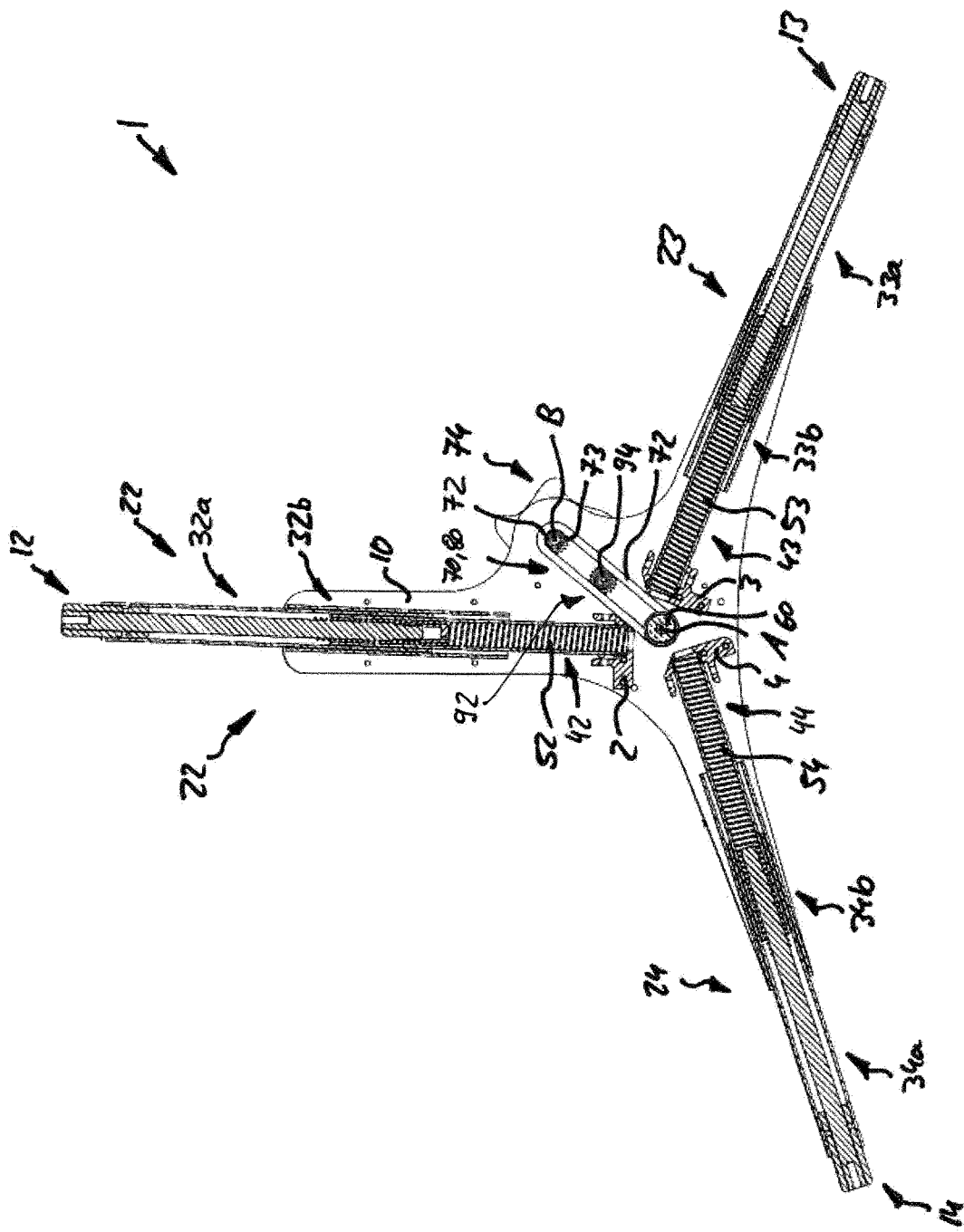
FIG. 5 shows a sectional view of the wheel holder shown in FIGS. 2 to 4.

FIG. 2 shows a perspective view of a wheel holder 1 according to an embodiment of the invention. FIG. 3 shows a plan view of the wheel holder 1 from the rear side of the wheel holder 1 facing the wheel 9 in the mounted state of the wheel holder 1; FIG. 4 shows a plan view of the wheel holder 1 from the front side of the wheel holder 1 facing away from the wheel 9 in the mounted state; and FIG. 5 shows a sectional view of the wheel holder 1.

In the wheel holder 1 shown in FIGS. 2 to 5, the base body 10 is in the form of a base plate 10. Three arms 22, 23, 24 extend radially outwards from a central portion of the base plate 10. The arms 22, 23, 24 extend substantially in a common plane oriented substantially parallel to the plane of the base plate 10. The three arms 22, 23, 24 may, but need not, be oriented at equal angular intervals of 120° to one another about a central portion of the wheel holder 1.

Claws 12a, 13a, 14a are formed on outer ends of the arms 22, 23, 24 facing away from the base plate 10 and extend substantially at right angles to the plane of the arms 22, 23, 24. The claws 12a, 13a, 14a are provided to abut against the tread surface 7 of a wheel 9 when the wheel holder 1 is attached to the wheel 9 in order to fix the wheel holder 1 to the wheel 9 as shown in FIG. 1.

The claws 12a, 13a, 14a have spacers 12b, 13b, 14b formed thereon which extend substantially parallel to the arms 22, 23, 24. The spacers 12b, 13b, 14b are provided to abut against the flank of the wheel 9 when the wheel holder 1 is mounted on the wheel 9 to ensure that the wheel holder 1 is positioned at the correct distance from the wheel 9 and oriented in the correct orientation, in particular orthogonal to the axis of rotation R of the wheel 9 (cf. FIG. 1).

The arms 22, 23, 24 each comprise a stationary inner element 32b, 33b, 34b, which is fixedly connected to the base plate 10 or is integrally formed with the base plate, and a movable outer element 32a, 33a, 34a, which is displaceable in the radial direction relative to the respective stationary inner element 32b, 33b, 34b. In particular, the movable outer elements 32a, 33a, 34a are formed as radially displaceable slides which are at least partially enclosed by the associated stationary inner element 32b, 33b, 34b. In this way, the movable outer elements 32a, 33a, 34a and the stationary inner elements 32b, 33b, 34b together form a respective telescoping mechanism on each of the arms 22, 23, 24. In embodiments not shown in the figures, each telescoping mechanism may also comprise a plurality of movable elements 32a, 33a, 34a that are movable relative to each other along a common axis.

The length of the arms 22, 23, 24 can thus be varied by moving, in particular sliding, the outer elements 32a, 33a, 34a relative to the inner elements 32b, 33b, 34b.

Each arm 22, 23, 24 comprises a respective compression spring 52, 53, 54 (see FIG. 5) enclosed by a casing, in particular a sleeve, 42, 43, 44. Each compression spring 52, 53, 54 is supported between an inner end of the movable outer element 32a, 33a, 34a of the respective arm 22, 23, 24 and a supporting surface 2, 3, 4 formed on the base plate 10 in such a way that it pushes the respective outer element 32a, 33a, 34a outwards from a central portion of the base plate 10 in a radial direction. The compression springs 52, 53, 54 thus strive to extend the length of the arms 22, 23, 24. In the exemplary embodiment shown in FIGS. 2 to 5, the supporting surfaces 2, 3, 4 are formed as supporting elements 2, 3, 4 arranged on the base plate 10. The supporting elements 2, 3, 4 can be attached to the base plate 10 or formed integrally with the base plate 10.

A central pulley 60 is located in the central portion of the base plate 10. A traction element 62, 63, 64 is connected to the pulley 60 for each of the arms 22, 23, 24. The pulley 60 thus forms a coupling element 60 which mechanically couples the traction elements 62, 63, 64 to one another. The traction elements 62, 63, 64 are formed in particular as rope strands 62, 63, 64. The traction elements/rope strands 62, 63, 64 can be formed from metal, in particular from steel ropes, or from a suitable plastics material, e.g. nylon.

Figure 6:
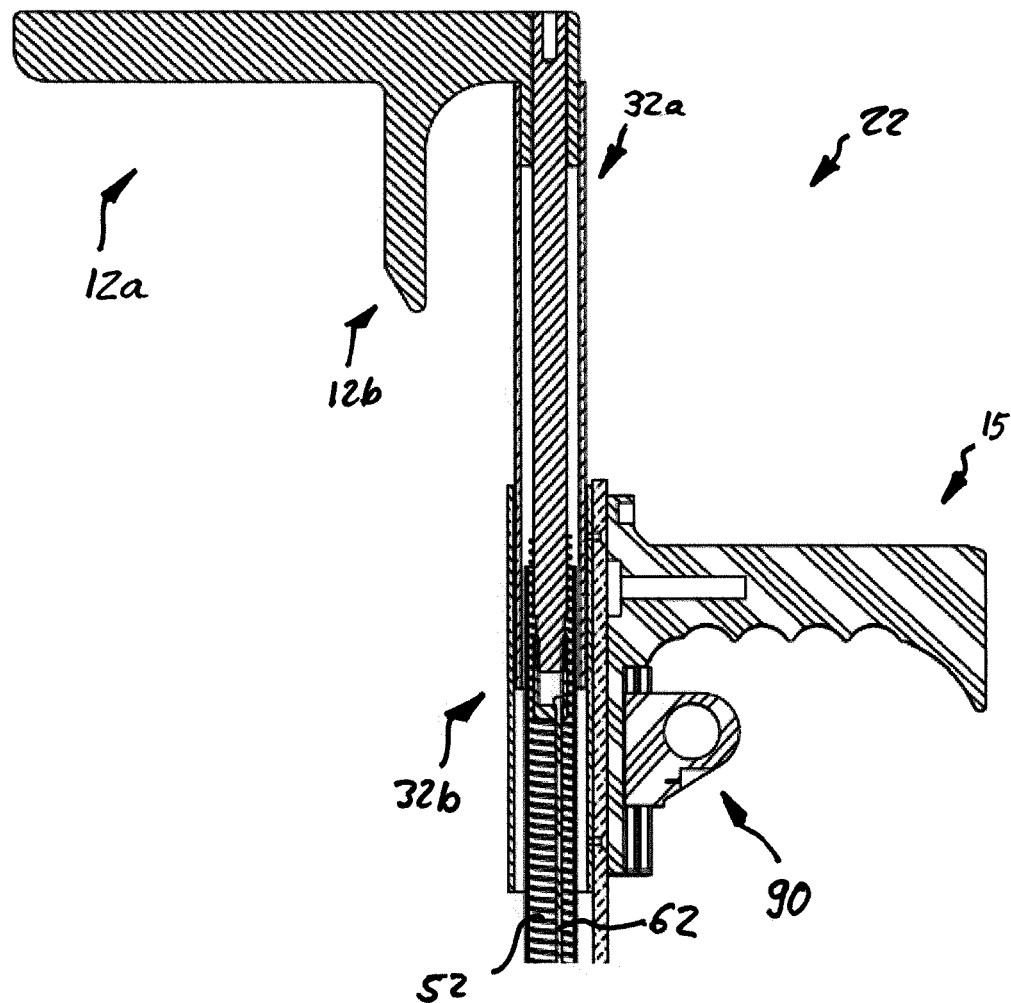
FIG. 6 shows a sectional view of an outer portion of one of the arms of a wheel holder designed according to the invention.

The outer ends of the traction elements 62, 63, 64 facing away from the pulley 60 are each connected to an inner end of the respective movable outer element 32a, 33a, 34a. This can be seen in particular in FIG. 6, which shows a sectional view of an outer portion of one of the arms 22, 23, 24 of a wheel holder 1 according to the invention. FIG. 6 also shows that the traction elements 62, 63, 64 extend between the pulley 60 and the inner end of the respective movable outer element 32a, 33a, 34a in radial direction through a hollow interior space of the respective compression spring 52, 53, 54.

By rotating the pulley 60 about a central shaft A that is rotatably supported on the base plate 10, the traction elements 62, 63, 64 can be wound onto and unwound from the pulley 60. The length of the traction elements 62, 63, 64 can thus be varied by rotating the pulley 60.

The movable outer elements 32a, 33a, 34a can therefore be pulled radially inwards towards the central portion of the base plate 10 by rotating the pulley 60 about the central shaft A against the force of the compression springs 52, 53, 54. By fixing the pulley 60, the movable outer elements 32a, 33a, 34a can be retained in a desired position.

The pulley 60 is connected to an elastic drive element 65 by the central shaft A which extends between the front side and the rear side of the wheel holder 1 through the base plate 10. The elastic drive element 65 is, for example, a spiral spring 65 and is designed to drive the pulley 60 in such a way that the movable outer elements 32a, 33a, 34a are pulled radially inwards, i.e. towards the central shaft A, by the traction elements 62, 63, 64 against the force of the compression springs 52, 53, 54.

The elastic drive element 65 and the compression springs 52, 53, 54 are configured such that the inwardly directed force exerted by the elastic drive element 65 on a movable element 32a, 33a, 34a via the pulley 60 and the traction elements 62, 63, 64 is greater than the outwardly directed force exerted by the respective compression spring 52, 53, 54 on the respective movable element 32a, 33a, 34a. Thus, an inwardly directed resultant force remains which pulls the movable outer elements 32a, 33a, 34a inwards toward the central portion of the base plate 10 in the radial direction.

In the embodiment shown in FIGS. 2 to 5, the pulley 60 and the elastic drive element 65 are arranged on different sides of the base plate 10. In other embodiments not shown in the figures, the pulley 60 and the elastic drive element 65 may also be arranged on the same side of the base plate 10.

For mounting the wheel holder 1 to a wheel 9, as shown in FIG. 1, the movable outer elements 32a, 33a, 34a are pulled outwardly against the resulting inwardly acting force by a user using muscle power to extend the arms 22, 23, 24 sufficiently to apply the wheel holder 1 to the wheel 9.

In doing so, it is sufficient to grasp one of the movable outer elements 32a, 33a, 34a and pull it outwardly with respect to the base plate 10. The movement of one of the movable outer elements 32a, 33a, 34a causes the pulley 60 to rotate. The rotation of the pulley 60 relieves the traction elements 62, 63, 64 of the other movable outer elements 32a, 33a, 34a which are not directly moved by the user, and the movable elements 32a, 33a, 34a of the other arms 22, 23, 24 are pushed outwards by their respective compression springs 52, 53, 54.

The combination of compression springs 52, 53, 54, traction elements 62, 64, pulley 40 and drive element 65 thus constitutes a synchronization system that causes all movable outer elements 32a, 33a, 34a to move synchronously outwards in the radial direction when one of the movable outer elements 32a, 33a, 34a is pulled outwards.

Similarly, all movable outer elements 32a, 33a, 34a move synchronously inwards in the radial direction under the influence of the drive element 65 when the outwardly pulled movable element 32a, 33a, 34a is released or moved inwards after the wheel holder 1 has been applied to the wheel 9. As a result of the inwardly directed resultant forces described above, the wheel holder 1 is fixed to the wheel 9, as shown schematically in FIG. 1.

In order to be able to fix the wheel holder 1 even more securely to the wheel 9, a clamping and locking mechanism 70, 80 is provided in addition.

The clamping and locking mechanism 70, 80 comprises a clamping mechanism 70 which allows additional inwardly directed forces to be applied to the movable outer elements 32a, 33a, 34a which press the movable outer elements 32a, 33a, 34a even more firmly against the tread surface 7 of the wheel 9 when the wheel holder 1 is mounted on the wheel 9.

Furthermore, the clamping and locking mechanism 70, 80 includes a locking mechanism 80 that allows the movable outer elements 32a, 33a, 34a to be locked in a position in which the claws 12, 13, 14 are in contact with the tread surface 7 of the wheel 9 in order to maintain the increased contact pressure without permanently acting on the wheel holder 1 from the outside.

Although the clamping mechanism 70 and the locking mechanism 80 are combined into one clamping and locking mechanism 70, 80 in the exemplary embodiment shown in the figures, the clamping mechanism 70 and the locking mechanism 80 may also be formed independently of each other in further embodiments not explicitly shown in the figures.

The clamping and locking mechanism 70, 80 shown in the figures comprises a force transmitting element 72, e.g. a chain or a belt, which is in operative connection with the pulley 60 and enables an additional torque to be applied to the pulley 60.

The force transmitting element 72 may, for example, engage a set of teeth, not visible in the figures, formed on the outer periphery of the central shaft A on which the pulley 60 and the elastic drive element 65 are mounted.

The force transmitting element 72 is also operatively connected, in particular via another gear 73, to a second shaft B, which is mounted on the base plate 10 in a decentralized location, i.e. outside the central portion. A manually operable actuating element 74, for example a hand wheel or lever, is provided on the second shaft B.

In the exemplary embodiment shown in FIGS. 2 to 5, the force transmitting element 72 is located on the rear side of the wheel holder 1, and the manually operable actuating member 74 is located on the front side of the wheel holder 1, so that it can be easily operated when the wheel holder 1 is attached to a wheel 9. In other embodiments, the force transmitting element 72 may also be arranged on the front side of the wheel holder 1.

By manually rotating the additional gear 73, in particular with the aid of the actuating element 74, an additional torque can be applied to the pulley 60 via the force transmitting element 72. In this way, additional inwardly acting forces can be applied to the movable outer elements 32a, 33a, 34a via the traction elements 62, 63, 64. The additional forces pull the movable outer elements 32a, 33a, 34a inwards so that the claws 12a, 13a, 14a are pressed even more firmly against the tread surface 7 of the wheel 9 and the wheel holder 1 is fixed even more securely to the wheel 9.

Figure 7:
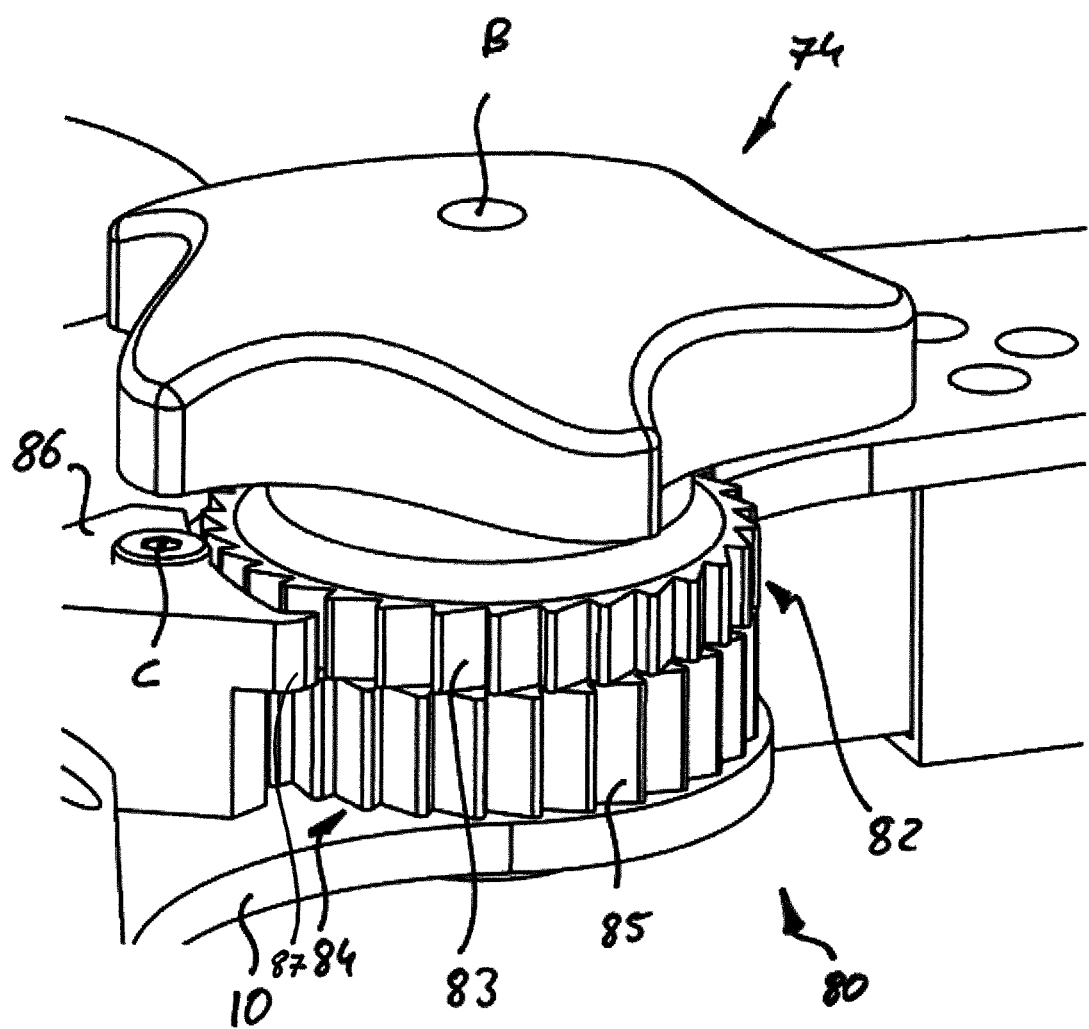
FIG. 7 shows an enlarged perspective view of a locking mechanism of a wheel holder designed according to the invention.

In addition, a locking mechanism 80 is also formed on the second shaft B, which makes it possible to maintain an additional torque applied to the pulley 60 without having to manually retain the actuating element 74. FIG. 7 shows an enlarged perspective view of the locking mechanism 80.

The locking mechanism 80 comprises two ratchet gears 82, 84 mounted coaxially one above the other on the second shaft B. The teeth 83, 85 of the two ratchet gears 82, 84 each have steep flanks in a first direction of rotation and flat flanks in a second, opposite direction of rotation.

The two ratchet gears 82, 84 are arranged such that the steep flanks and the flat flanks of the teeth 83, 85 of the two ratchet gears 82, 84 are oriented in opposite directions of rotation. That is, the flat flanks of the teeth 83 of the first ratchet gear 82 are oriented in the same direction of rotation as the steep flanks of the teeth 85 of the second ratchet gear 84, and the steep flanks of the teeth 83 of the first ratchet gear 82 are oriented in the same direction of rotation as the flat flanks of the teeth 85 of the second ratchet gear 84.

The locking mechanism 80 also includes a locking member 86 movably mounted to the base plate 10 and having two pawls 87 selectively engageable with the teeth 83, 85 of one of the two ratchet gears 82, 84 by moving the locking member 86. In FIG. 7, only one pawl 87 is visible, since the second pawl 87 is formed on the rear side of the locking member 86 facing away from the viewer.

In particular, the locking member 86 is pivotable about a pivot axis C oriented orthogonally to the base plate 10 between a first position, in which a first pawl 87 is in engagement with the teeth 83 of the first ratchet gear 82, and a second position, in which a second pawl 87 not visible in FIG. 7 is in engagement with the teeth 85 of the second ratchet gear 84.

The locking member 86 is connected to a switching mechanism, which in particular comprises a spring 88 and a switching element 90 (see FIGS. 4 and 6). By operating the switching element 90, the locking member 86 can be moved between the first position and the second position.

When the locking member 86 is in its first position, the first pawl 87 abuts against the steep flanks of the teeth 83 of the first ratchet gear 82, thereby blocking rotation of the second shaft B in a first direction of rotation, in particular clockwise rotation. The flat flanks of the teeth 83 of the first ratchet gear 82 allow rotation of the second shaft B in an opposite second direction of rotation, in particular counterclockwise. The second pawl 87 (not visible in FIG. 7) is not engaged with the second ratchet gear 84 when the locking member 86 is in its first position.

When the locking member 86 is in its second position, the first pawl 87 is not engaged with the teeth 83 of the first ratchet gear 82. The second pawl 87 (not visible in FIG. 7) then abuts against the steep flanks of the teeth 85 of the second ratchet gear 84, thus blocking rotation of the second shaft B in the second direction of rotation, in particular counterclockwise rotation. When the locking member 86 is in the second position, the flat flanks of the teeth 85 of the second ratchet gear 84 allow the second shaft B to rotate in an opposite first direction of rotation, in particular clockwise rotation.

Optionally, the locking member 86 can also be pivotable to a third (middle) position ("freewheeling position") in which neither of the two pawls 87 engages the teeth 83, 85 of either of the two ratchet gears 82, 84, so that the second shaft B is free to rotate in either direction when the locking member 86 is in the freewheeling position.

For mounting the wheel holder 1 to a wheel 9, the locking member 86 is moved to its first position. The locking mechanism 80 then allows a user to pull the movable outer elements 32a, 33a, 34a outwardly with muscle power. Inward movement of the outer elements 32a, 33a, 34a is blocked by the locking mechanism 80.

The movable outer elements 32a, 33a, 34a can thus be brought, in particular by pulling on one of the movable outer elements 32a, 33a, 34a, into a configuration in which the radial distances between the claws 12a, 13a, 14a are large enough for the wheel holder 1 to be applied to the wheel 9. Due to the blocking action of the locking mechanism 80, the outer elements 32a, 33a, 34a remain in this position even when no external force is applied to the outer elements 32a, 33a, 34a by the user anymore, and the wheel holder 1 can be conveniently applied to the wheel 9 with the extended arms 22, 23, 24.

After the wheel holder 1 has been applied to the wheel 9, the locking member 86 is moved to its second position by operating the switching element 90. When the locking member 86 is in its second position, the locking mechanism 80 allows the movable outer elements 32a, 33a, 34a to move inwards towards the central portion of the base plate 10 under the influence of the forces exerted by the elastic drive element 65 via the pulley 60 and the traction elements 62, 63, 64. As a result, the claws 12a, 13a, 14a are pressed against the tread surface 7 of the wheel 9 and the wheel holder 1 is fixed to the wheel 9.

By rotating the second shaft B, e.g. by means of the actuating element 74, an additional inwardly directed force can be applied to the movable outer elements 32a, 33a, 34a in order to fix the wheel holder 1 even more securely to the wheel 9, as has been described hereinbefore.

As long as the locking member 86 is in the second position, the locking mechanism 80 prevents the movable outer elements 32a, 33a, 34a with the claws 12a, 13a, 14a from moving outwards again, even if the actuating element 74 is released. The wheel holder 1 therefore remains securely fixed to the wheel 9 even after the actuating element 74 is released.

When the wheel holder 1 is to be removed from the wheel 9 again, the locking member 86 is moved to its first or third position by operating the switching element 90. When the locking member 86 is in the first or third position, the locking mechanism 80 allows the movable outer elements 32a, 33a, 34a to move radially outwards so that the claws 12a, 13a, 14a no longer rest against the tread surface 7 of the wheel 9 and the wheel holder 1 can be safely and conveniently removed from the wheel 9.

In order to prevent uncontrolled rapid movements of the movable outer elements 32a, 33a, 34a which may cause damage to the vehicle and/or injury to the user, the wheel holder 1 additionally comprises a braking mechanism 92. The braking mechanism 92 is designed to attenuate or decelerate movements of the movable outer elements 32a, 33a, 34a in at least one radial direction. In particular, the braking mechanism 92 is configured to attenuate inward movements of the movable outer elements 32a, 33a, 34a.

In the exemplary embodiment shown in the figures, the braking mechanism 92 is configured as a rotation brake 92. The braking mechanism 92 configured as rotation brake 92 comprises a brake wheel 94, in particular a brake wheel 94 designed as a gear wheel, which is in operative connection, in particular in engagement, with the force transmitting element 72.

The rotation brake 92 is configured such that the brake wheel 94 is freely rotatable in a first direction of rotation corresponding to the outward movement of the movable outer elements 32a, 33a, 34a to allow the movable outer elements 32a, 33a, 34a to be easily pulled apart or extended. In a second direction of rotation opposite to the first direction of rotation and corresponding to the inward movement of the movable outer elements 32a, 33a, 34a, the rotation of the brake wheel 94 is decelerated by a suitably configured braking mechanism so that it decelerates the movement of the force transmitting element 72 and hence the movement of the movable outer elements 32a, 33a, 34a.

In an alternative embodiment, the braking mechanism 92 may also be configured to brake or decelerate the rotation of the brake wheel 94 in both directions so as to decelerate the movements of the movable outer elements 32a, 33a, 34a in both directions.

In further embodiments not shown in the figures, the braking mechanism 92 may also be arranged directly on one of the shafts A, B and act directly on the pulley 60 or the actuating element 74.

The invention claimed is:

1. A wheel holder for clamping attachment to a wheel, and for attaching a target or sensor for vehicle wheel alignment measurement, the wheel holder comprising:
 a base body with a central portion;
 at least two arms extending radially outwards from the central portion of the base body;
 each of said arms comprising:
  a movable element movable relative to the base body in the radial direction in order to vary the length of the arm in the radial direction;
  a compression spring, arranged and designed to push the movable element outwards in the radial direction; and
  a traction element mechanically coupled to the movable element and arranged and designed to pull the movable element inwards in the radial direction;
 wherein the wheel holder comprises a coupling element that mechanically couples the traction elements of the at least two arms to each other.

2. The wheel holder according to claim 1,
 wherein each of said arms comprises a stationary element that is fixedly connected to the base body or integrally formed with the base body;
 wherein the movable element is displaceable relative to the stationary element in the radial direction, wherein the movable element is designed as a slide that is guided relative to the stationary element or at least partially enclosed by the stationary element; and
 wherein the movable element has at an outer end a claw for abutment against a tire tread surface of the wheel and/or a spacer for abutment against a tire flank of the wheel.

3. The wheel holder according to claim 1,
 wherein the coupling element comprises a central pulley which is rotatably mounted about a central shaft, in particular in the central portion of the base body;
 wherein the traction elements, which are in particular formed as rope strands, are fixed with a first end to the central pulley and with a second end to the respective movable element;
 wherein the traction elements are adapted to be wound on the central pulley and unwound from the central pulley;
 wherein the central pulley is mechanically coupled to an elastic drive element, which is connected to the central shaft of the central pulley and which biases the central pulley in such a way that a radially inwardly acting traction force is applied to the movable elements via the traction elements.

4. The wheel holder according to claim 3, wherein the compression springs and the drive element are designed such that the inwardly acting traction forces of the traction elements are greater than radially outwardly directed compressive forces of the compression springs, so that the resulting force pulls the movable elements inwards in the radial direction.

5. The wheel holder according to claim 3,
 wherein the at least two arms of the wheel holder extend in a common plane and
 wherein the central shaft is oriented orthogonally to the common plane.

6. The wheel holder according to claim 3,
 wherein the wheel holder additionally comprises a clamping mechanism that is designed to apply to the movable elements an additional clamping force acting inwardly in the radial direction.

7. The wheel holder according to claim 6,
wherein the clamping mechanism comprises a manually operable actuating element that is mechanically coupled to the movable elements;
wherein the actuating element is arranged at a radial distance from the central pulley and on a front side of the wheel holder, and is operatively connected to the coupling element by means of a force transmitting element on a rear side of the wheel holder, so that a torque applied manually via the actuating element can be transmitted to the coupling element via the force transmitting element, as a result of which the traction elements apply to the movable elements additional clamping forces acting inwardly in the radial direction.

8. The wheel holder according to claim 7,
further comprising a braking mechanism adapted to decelerate the movement of the movable elements from the extended positions in the radial direction inwardly;
wherein the braking mechanism is designed as a rotation brake with a brake wheel moving concomitantly with the force transmitting element, of the clamping mechanism;
wherein the brake wheel is rotatable with resistance in a direction corresponding to the direction of movement of the movable elements radially inwards; and
wherein the brake wheel is freely rotatable in an opposite direction corresponding to the direction of movement of the movable elements radially outwards.

9. The wheel holder according to claim 7,
wherein the wheel holder additionally comprises a locking mechanism configured to block the movement of the movable elements in a first radial direction and to release the same in a second radial direction opposite to the first radial direction;
wherein the locking mechanism is switchable between a first state in which the movement of the movable elements is blocked in a first radial direction and released in a second radial direction opposite to the first radial direction, and a second state in which the movement of the movable elements is released in the first radial direction and blocked in the second radial direction.

10. The wheel holder according to claim 9,
wherein the locking mechanism comprises at least one ratchet gear and at least one locking member configured to engage teeth of the ratchet gear;
wherein the teeth of the at least one ratchet gear have steep and flat flanks and the locking member is arranged to be pivotable into a locking position in which a pawl of the locking member engages between a steep flank and a flat flank of the teeth of the ratchet gear, abutting against the steep flank and thus blocking rotation of the ratchet gear;
wherein the at least one ratchet gear is arranged on a shaft (A, B) of the coupling element or of the actuating element.

11. The wheel holder according to claim 10,
wherein two ratchet gears, each with a different orientation of the steep and flat flanks, are arranged coaxially one above the other on a common shaft (B),
wherein the locking member is pivotable by a switching mechanism between at least two positions, namely a first position in which a pawl of the locking member engages between a steep and a flat flank of the teeth of a first ratchet gear, abutting against the steep flank and preventing rotation of the first ratchet gear in a first direction of rotation, and a second position in which a pawl of the locking member engages between a steep and a flat flank of the teeth of a second ratchet gear, abutting against the steep flank and blocking rotation of the second ratchet gear in a second direction of rotation opposite to the first direction of rotation;
wherein the locking member is pivotable to a third freewheeling position, in which the locking member does not engage any of the ratchet gears, so that the locking mechanism allows rotation of the shaft (B) in both directions.

12. A method of mounting a wheel holder according to claim 3 to a wheel of a motor vehicle, the method comprising the following steps:
manually pulling one of the movable elements radially outwards while unwinding the traction element of the movable element from the coupling element, thereby also unwinding the traction element of the other movable element or the traction elements of the other movable element from the coupling element, so that also the other movable element or the other movable elements are synchronously moved outwards by the compression spring(s) thereof;
applying the wheel holder in centered manner on the wheel of the motor vehicle, with claws formed at the ends of the arms, on the tire tread surface; and
releasing the movable element, whereby the movable elements are pulled inwards due to the torque exerted by the drive element, thereby fixing the wheel holder to the wheel;
wherein the method comprises additional clamping of the movable elements by manual operation of a clamping mechanism and/or locking of the movable elements by activation of a locking mechanism.

13. A method of unmounting a wheel holder according claim 3 from a wheel of a motor vehicle, the method comprising the following steps:
if necessary, manually releasing a previously activated locking mechanism;
manually pulling at least one movable element radially outwards while unwinding the traction element connected to the movable element from the coupling element, thus unwinding also the traction element of the other movable element or the traction elements of the other movable elements from the coupling element, so that also the other movable element or the other movable elements are synchronously moved outwardly by the compression spring(s) thereof, whereby claws formed at the ends of the arms are released from the tire tread surface;
laterally removing the wheel holder from the wheel;
releasing or manually returning the movable element to a radially inner position,
synchronously returning the other movable element of the other arm or the other movable elements of the other arms to the radially inner position by pulling the movable elements radially inwards by the drive element, the coupling element and the traction elements;
wherein the method comprises decelerating the movement of the movable elements from radially outer positions back inwardly by a braking mechanism.

14. The wheel holder according to claim 1,
wherein the compression spring of each arm is supported with a first end on the base body, and is supported with a second end on the movable element.

15. The wheel holder according to claim 14,
wherein the compression spring of each arm is at least partially surrounded by a casing.

16. The wheel holder according to claim 1,
wherein the traction elements are formed as rope strands, and wherein each of the rope strands extends in the radial direction through a respective inner space of one of the compression springs.

\* \* \* \* \*